Figure 1:
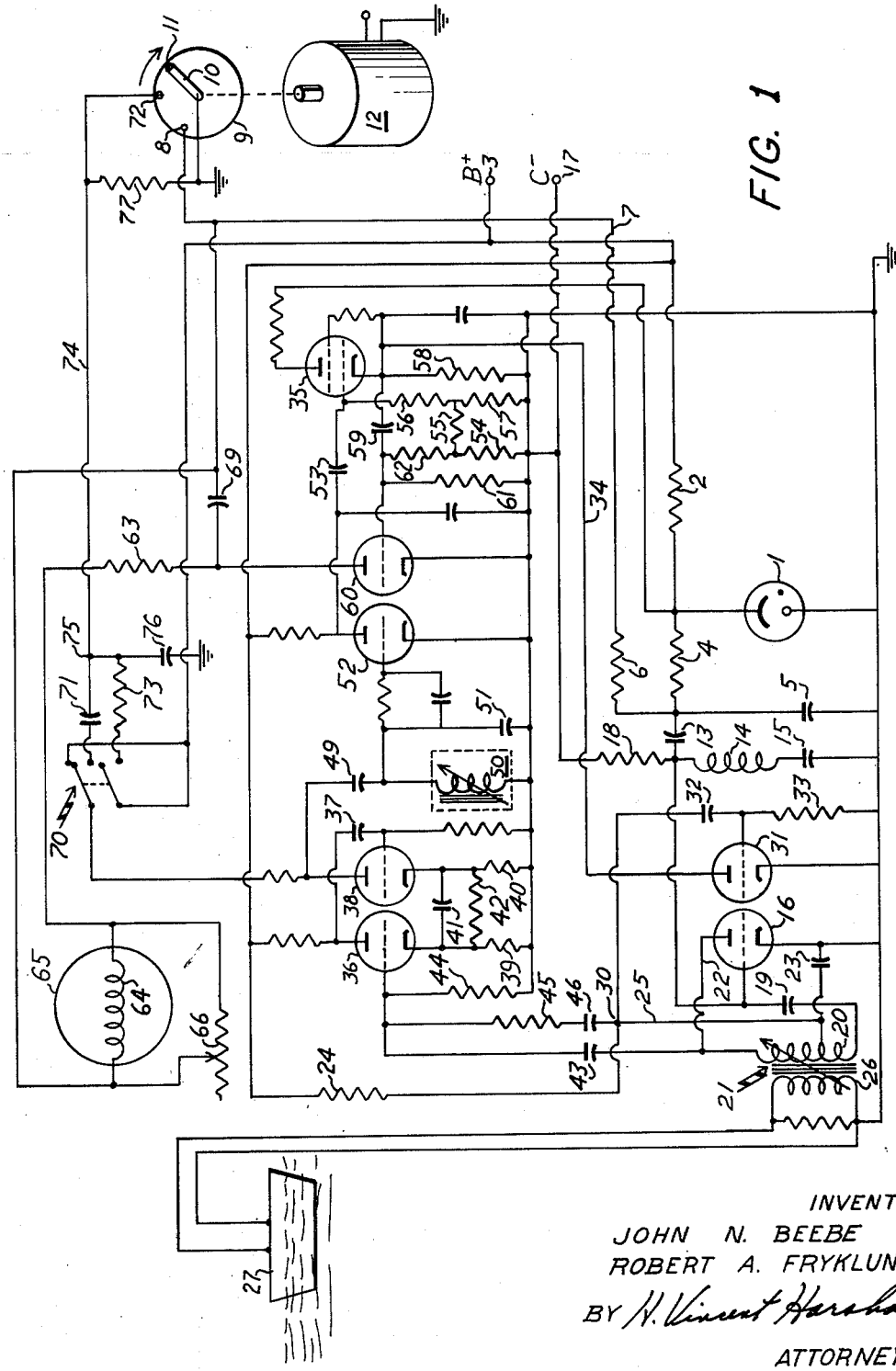

INVENTORS
JOHN N. BEEBE
ROBERT A. FRYKLUND
BY N. Vincent Harsha
ATTORNEY

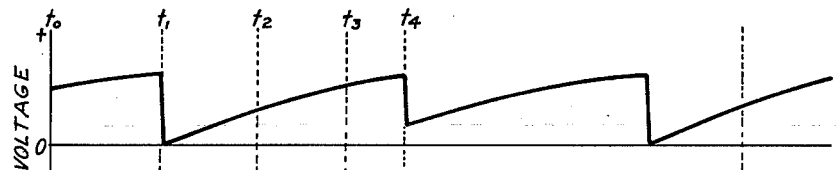
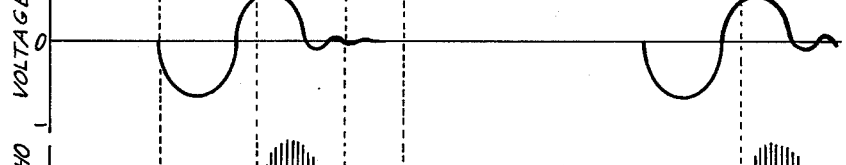
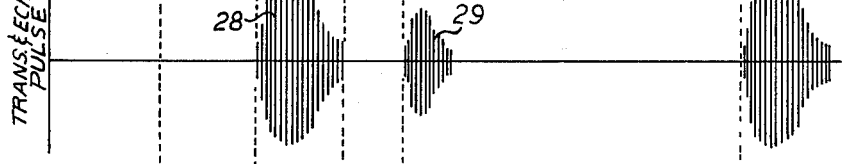
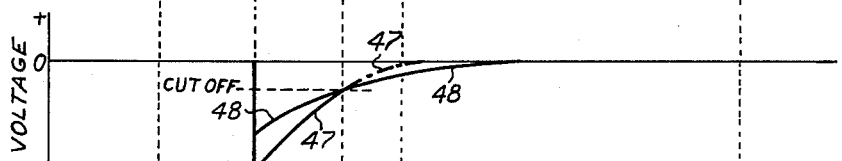
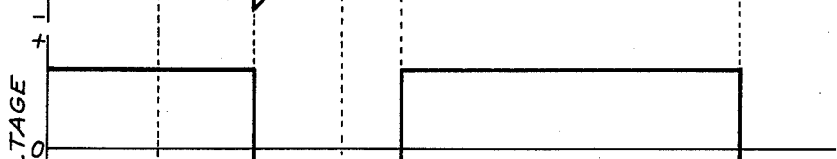
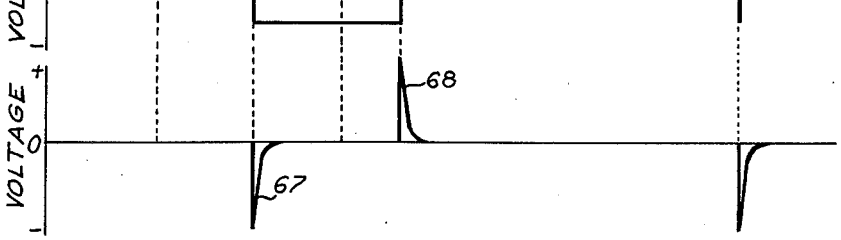

United States Patent Office 3,036,289
Patented May 22, 1962

3,036,289
SOUND RANGING SYSTEMS
John N. Beebe, Needham, and Robert A. Fryklund, Dedham, Mass., assignors to Raytheon Company, a corporation of Delaware
Filed Feb. 27, 1959, Ser. No. 795,963
4 Claims. (Cl. 340—3)

This invention relates in general to apparatus for determining the distance to target by measuring the elapsed time between the transmission of sonic wave energy toward a target and the reception of wave energy reflected from the target and more particularly to an improved marine sound ranging system for determining the depth of a body of water or the presence and depth of objects in the water, such as a school of fish.

This invention is an improvement upon the sound ranging distance measuring system disclosed in U.S. Pat. No. 2,502,938 and its advantages are that it permits a device to be constructed which provides better accuracy at shallow depths and is less expensive than its predecessor device. The linear time base sweep generator of the prior system has been changed to provide an exponential time base sweep which permits a meter having an exponentially calibrated depth scale to be employed. This provides an expanded scale at shallow depths where accuracy is most important. As meter accuracy is specified as a percentage of full scale reading, the exponentially calibrated scale reduces the error of the indicating meter by causing the pointer to move over a large part of the scale even at shallow depths. The time base sweep generating circuit is controlled by a constant speed motor and keying contacts rather than the hydrogen thyratron tube previously used. Utilization of electro-mechanical keying apparatus in lieu of the previously used gas tube permits the time base sweep voltage to be brought to a true zero reference potential thereby improving accuracy of the time base voltage sweep by assuring a stable reference potential. In the improved system, keying of the system to initiate a cycle resulting in the transmission of a pulse of sonic energy is accomplished by a contact carried by a rotor attached to the shaft of the constant speed motor. The rotating contact is adapted to complete an electrical circuit through a fixed contact embedded in an insulator to provide a discharge path for a timing capacitor, the discharge of that capacitor causing an oscillator to be set into operation which in turn causes a transducer to generate sonic energy. The signal for keying the oscillator into operation is now obtained from a simple inductance-capacitance tuned circuit instead of the more expensive differentiation transformer previously employed.

The new arrangement additionally provides a simple and efficient means of providing a calibration marker signal whereby the accuracy of the meter may be ascertained and means are provided for adjusting the meter to procure accurate readings. A calibration marker signal, which is in effect an artificial echo signal, is obtained by placing a second contact a fixed distance from the keying contact along the circle swept out by the rotating contact. The keying and calibration contacts are molded in a single insulator block, thus assuring a fixed time between generation of a transmitted pulse and the generation of a calibration marker signal, that time depending only on the speed of the constant speed motor.

The arrangement of the echo ranging system and the distinctive features of the invention can be apprehended by a perusal of the following detailed description when considered in conjuction with the accompanying drawings in which:

FIG. 1 is a schematic representation of circuitry embodying the invention;

FIG. 2A shows the variation with time of the voltage across time base capacitor 5;
FIG. 2B indicates the oscillations occurring when tuned circuit 14, 15 is shock excited;
FIG. 2C indicates the occurrence in time of the transmitted pulse and an echo pulse;
FIG. 2D is a representation of the time varied gain control voltage applied to the grid of the first amplifying tube;
FIG. 2E shows the voltage variations at the grid of gas discharge tube 35;
FIG. 2F shows the pips resulting from differentiation of the waveform shown in FIG. 2E.

Referring now to FIG. 1, there is shown a gas diode voltage regulator tube 1 having its cathode connected to ground and its anode connected through a current limiting resistor 2 to a source of positive potential (B+) applied between ground and terminal 3. A resistor 4 is serially connected to a time base capacitor 5 to form an R-C network and the network is shunted across the voltage regulator tube 1 whereby the time base capacitor may charge toward the voltage across the regulator tube at a rate determined by the value of resistor 4 and the capacitance of the time base capacitor. One side of capacitor 5 is connected through a resistor 6 and conductor 7 to a fixed keying contact 8 embedded in an insulating block 9. A rotor 10, carrying a spring contact 11, is driven at a uniform rate by a constant speed or synchronous motor 12 so that when the contact 11 passes over the keying contact 8, a circuit to ground is completed through the rotor 10. The grounding of keying contact 8 causes time base capacitor 5 to discharge through resistor 6 toward ground potential. Time base capacitor 5 discharges very rapidly and is completely discharged at the time contacts 8 and 11 separate. In order to limit the discharge current to a reasonable value, the resistor 6 is placed in the discharge circuit. Immediately, upon the separation of contacts 8 and 11, capacitor 5 commences to charge through resistor 4 toward the constant voltage established across regulator tube 1. The value of resistor 4 is quite high so that the charging time of condenser 5 is long compared to its discharge time. For example, the charging time may be in the order of 3500 times longer than the discharge time. FIG. 2A is a graph indicating the voltage across time base capacitor 5 as time progresses. It will be assumed that the capacitor at time $t_0$ is charged to 80% of the voltage across voltage regulator tube 1 and continues to charge exponentially, until at time $t_1$, when the keying contact 8 is connected to ground through contact 11, the voltage across the capacitor drops rapidly toward ground potential as the capacitor discharges. The capacitor discharges completely in a very short time. At the time contacts 8 and 11 separate the capacitor is at ground potential again and commences to charge exponentially toward the voltage across regulator tube 1.

The discharge of time base capacitor 5, due to the voltage drop across resistor 6, causes a negative going pulse to be coupled through capacitor 13 to a tuned circuit formed by the inductor (L) 14 in series with capacitor (C) 15. The tuned L-C circuit 14, 15 has a low Q, or may be critically damped if desired, and that circuit is shocked into oscillation by the negative pulse from capacitor 13. The tuned L-C circuit is connected between the grid and cathode of an oscillator tube 16, that tube normally being biased beyond cut-off by a biasing voltage (C−) impressed at terminal 17 and applied to the grid of tube 16 through resistor 18. The tube 16 is connected in a blocking oscillator circuit which includes a capacitor 19 connected between the grid of that tube and one end of the winding 20 of a transformer 21, a conductor 22 connecting the anode of tube 16 to the other end of winding 20, and a capacitor 23 connected between a tap of winding 20 and the cathode of tube 16. Plate voltage is applied to the anode of tube 16 through resistor 24, conductor 25, a portion of winding 20, and conductor 22. As indicated in FIG. 2B, at time $t_1$, the tuned circuit 14, 15 is shocked into oscillation by the discharge of the time base capacitor 5, and the initial oscillation of the L-C circuit is negative going. This negative going voltage does not affect the oscillator tube 16 because that tube is already cut-off by the C− bias on its grid. When the oscillation of the L-C circuit 14, 15 becomes sufficiently positive at time $t_2$, however, it triggers the oscillator circuit into operation. The oscillator generates oscillations in the winding 20 which are coupled to the winding 26 of transformer 21 and cause the transducer 27 to transmit sonic energy into the surrounding medium. The blocking oscillator, once it is triggered into operation, continues to oscillate until it is blocked by the charge on capacitor 19 built up by the flow of current through resistor 18. The duration of oscillator operation determines the length of the generated pulse. By choosing the values of the components in the blocking oscillator circuit, the operating frequency of the oscillator and the pulse length are determined. It is preferred, for marine use, that the operating frequency of the oscillator be in the vicinity of two hundred kilocycles and the pulse length be about 70 microseconds. The oscillating electrical energy in the winding 26 is transformed to compressional wave energy by the transducer 27 and radiated into the fluid surrounding the transducer. FIG. 2C illustrates the pulse of oscillatory energy in the windings of transformer 21. The "direct" pulse 28 is the pulse generated by the blocking oscillator and the "echo" pulse 29 is the energy reflected from a target which returns to the transducer 27. It will be noted from comparing FIGS. 2B and 2C that the direct pulse is initiated at time $t_2$ when the oscillation in the L-C circuit 14, 15 has swung positive. The L-C circuit 14, 15 is preferably tuned to oscillate at a frequency of 10 kilocycles and since the first half cycle, as seen by the grid of oscillator tube 16, is negative, it has no effect. The second half cycle occurring about 50 microseconds later drives the grid of tube 16 positive and triggers the oscillator. The delay between discharge of the time base capacitor 5 and activation of the oscillator permits the time base capacitor to accrue a small charge.

Sonic wave energy received by the transducer 27 due to reflection of the direct pulses which are incident upon an object in the path of transmission is converted to electrical energy in the transducer and the echo pulses are coupled through the windings of transformer 21 and capacitor 43 to an amplifying circuit. This returned energy is referred to as the "reflected pulse" or "echo pulse" and the magnitude of the echo pulse varies inversely with the distance of the reflective target from the transducer.

Upon the triggering into operation of the blocking oscillator, a negative voltage at the junction 30 of capacitor 23 and resistor 24 is applied to the grid of switch tube 31 through capacitor 32. The negative going voltage quickly drives tube 31 to cut-off and the time the tube remains cut-off is determined by the time constant of capacitor 32 and the resistor 33 which connects that capacitor to ground. The switch tube 31 is connected by the conductor 34 in the cathode circuit of a hydrogen thyratron tube 35. A sufficiently high plate voltage is supplied to switch tube 31 to render it conductive whenever the hydrogen thyratron 35 is fired and the switch tube has no grid bias. On the other hand, when a negative bias appears on the grid of switch tube 31, the tube is rendered non-conductive and either cuts off the hydrogen thyratron 35 if that tube is at the time conducting, or prevents the hydrogen thyratron from firing if a positive signal is applied to its control grid. Consequently, hydrogen thyratron 35 is in condition to be fired only when there is no negative bias on the grid of switch tube 31. The grid bias of switch tube 31 is controlled by the potential existing at point 30 and this potential is applied to the grid of the switch tube through coupling capacitor 32. It will be observed that when the oscillator tube 16 is in its quiescent state, point 30 has a high positive potential. When, however, the oscillator tube 16 is keyed into oscillation, the potential at point 30 is reduced sharply, producing a negative pulse which is coupled to the grid of switch tube 31. This negative pulse is produced at the time oscillator tube 16 generates a direct pulse and therefore switch tube 31 is cut off at the initiation of a direct pulse.

The receiving circuit includes a triode amplifying tube 36 having its anode connected through a capacitor 37 to the grid of a second amplifying tube 38, the two amplifying tubes 36, 38 having their cathodes connected to ground by resistors 39 and 40, respectively, and having their cathodes connected together by capacitor 41 in parallel with resistor 42 whereby signal energy is degeneratively fed back from the cathode of tube 38 to the cathode of tube 36. The control grid of triode 36 is connected through capacitor 43 to one end of the transformer winding 20. That control grid is also connected to ground by resistor 44 and is connected to junction 30 by resistor 45 and capacitor 46. When the voltage at junction 30 goes negative, upon keying of the blocking oscillator, a negative going signal for the full time constant of capacitor 23 and resistor 24 is coupled to the control grid of tube 36 through capacitor 46 and resistor 45, which signal functions as a time varied gain control voltage. Additional time varied gain control of tube 36 occurs by rectification of a small portion of the transmitted pulse by the control grid of tube 36. This additional time varied gain control is of higher negative voltage and shorter duration than the first mentioned time varied gain control. That is, a strong positive signal is impressed on the control grid of tube 36 when the blocking oscillator is keyed into operation causing current to flow to the grid of tube 36 and charge capacitors 43 and 46. Immediately after the direct pulse, capacitors 43 and 46 discharge, impressing a negative voltage on the grid of tube 36 which voltage exponentially approaches ground potential in a short time as indicated by the waveform 47 in FIG. 2D. The duration of discharge of capacitors 43 and 46 is determined by the capacitance values of 43 and 46 and the resistance values of resistors 44 and 45. This time varied gain curve eliminates the effect of ringing in the transducer or in the windings of the transformer immediately after transmission of the direct pulse. The time varied gain voltage due to capacitor 23 and resistor 24 also decreases exponentially but at a slower rate as indicated by curve 48 in FIG. 2D. The purpose of varying the gain of the amplifier is to decrease the sensitivity of the receiving circuit immediately after the transmission of a direct pulse so that the receiver is insensitive to the "hash" following a direct pulse. This hash results from mechanical "ringing" of the transducer 27 or from the continued oscillation of energy remaining in the windings of the transformer or from transmitted energy which is incident upon a turbulent area in the water around the hull of a vessel and is reflected by the turbulent water. The presence of this "hash" after the direct pulse cannot be permitted to interfere with the proper operation of the meter by causing spurious readings and by means of the time varied gain control the amplifier circuitry is rendered insensitive to "hash" while retaining adequate sensitivity to amplify echoes that are received from nearby targets, such as a shallow bottom or fish swimming underneath the hull. It will be observed from FIG. 2D that due to the time varied gain control voltage the amplifier is biased below cut-off during the generation of direct pulse 28 and that shortly thereafter, at time $t_3$, the gain control voltage increases toward normal amplifier grid bias along the curve 48. Since an echo from a nearby target has considerable strength, the receiver gain is reduced to a point where "hash" does not affect the receiver but a strong echo is still amplified by the receiver. As time progresses after the transmission of a direct pulse, the gain of the receiver continues to increase to that weak echoes received from distant targets arrive at the receiver at a time when the sensitivity of the receiver has been materially improved by the time varied gain control voltage and considerable amplification of the weak signals is effected. Thus the gain of amplifying tube 36 is very low shortly after the transmission of a direct pulse and the gain improves as time elapses. The amplified signal from the plate of tube 36 is coupled through capacitor 37 to the grid of tube 38 which further amplifies the signal. The anode of tube 38 is connected through capacitor 49 to a tuned circuit comprising a tunable inductor 50 in parallel with a capacitor 51. This parallel circuit is tuned to the frequency of the transmitted pulse. The signal appearing across tuned circuit 50, 51 is impressed on the control grid of a tube 52 connected as a grid-leak detector. The detector rectifies the echo signal pulse received from the amplifier circuit. The anode of detector tube 52 is coupled through a capacitor 53 to the control grid of hydrogen thyratron 35 so that the rectified pulse appears on the grid of the thyratron tube 35. The thyratron tube 35 is normally biased below its firing point by a negative potential impressed through terminal 17 and the resistive network 54, 55, 56, and 57. The output of detector 52 is impressed on the grid of thyratron tube 35 and if this tube is in condition to be fired, the reception of a rectified signal from the detector 52 will raise the grid above the firing point and tube 35 will conduct current. Once tube 35 is fired it continues to conduct current until it is extinguished by switch tube 31 being biased to cut-off. Since switch tube 31 is biased to cut-off upon the initiation of oscillations in the blocking oscillator, the hydrogen thyratron is extinguished at the initiation of the succeeding direct pulse. When thyratron tube 35 is fired, a rise in voltage ensues at its cathode due to the current flowing through resistor 58, the rise in voltage being differentiated and impressed on the grid of a sampling tube 60. Since thyratron 35 is extinguished upon commencement of the transmitted pulse and is fired by the first received echo signal, a square wave voltage appears from cathode to ground of the thyratron across resistor 58. The square wave voltage waveform is shown in FIG. 2E. The square wave voltage is differentiated by the action of capacitor 59 and resistors 61, 62, 55, and 57. FIG. 2F shows the voltage "spikes" or "pips" which are obtained by differentiation of the square wave. It will be noted that when thyratron 35 is extinguished at time $t_2$, the differentiated "pip" is negative going and that when thyratron 35 is fired at time $t_4$ upon the reception of an echo, the differentiator yields a positive going voltage pip.

The sampling tube 60 is biased beyond cut off by the negative voltage from terminal 17 which is impressed on the grid through resistors 54 and 62. The resistor 61 acts as a voltage divider and reduces the negative voltage to a value just sufficient to maintain tube 60 at cut-off. The anode of tube 60 is connected through resistor 63, the deflection coil 64 of meter 65, conductor 7 and resistor 6 to time base capacitor 5. Upon transmission of the direct pulse, the differentiated negative pip 67 has no effect on the sampling tube 60 since that tube is biased to cut-off. The first echo return at time $t_4$ gives rise to the positive pip 68 which is impressed on the control grid of tube 60 and causes the sampling tube to draw current until the time base capacitor 5 is almost completely discharged. This current proceeds through the deflection coil of meter 65 and the voltage drop across coil 64 and resistor 63 causes capacitor 69 to charge. At the end of the sampling pip 68, the capacitor 69 discharges through coil 64 and resistor 63 until charged again by a succeeding sampling pip. The time constant for the charging circuit of capacitor 69 is arranged such that a large number of sampling pips are required to fully charge capacitor 69. Conversely, the discharge circuit for capacitor 69 is such that a large number of keying cycles occur before capacitor 69 is fully discharged. With this arrangement, if a small percentage of echoes fail to activate the receiver, the indicating meter will merely show a reading of slightly less depth and will not fluctuate wildly.

For calibration purposes, a fixed marker pip is generated and inserted into the receiver circuit. To calibrate the device, the switch 70 is moved from the "operate" position illustrated in FIG. 1, to the "calibrate" position. With the switch in the "calibrate" position, plate voltage is removed from the anode of receiving tube 38 and that anode is connected through capacitor 71 to a second contact 72 embedded in the insulating block 9. Contact 72 has a positive voltage from terminal 3 impressed on it through resistor 73 and conductor 74. When contact 72 is grounded through rotor 10, the drop in voltage at point 75 is differentiated by the response of capacitor 76 and resistor 77 so that a differentiated pip appears at the anode of tube 38. This pip simulates an echo return and provides an artificial echo which is precisely timed with reference to the transmitted signal. The artificial echo signal thereafter has the same effect as an actual echo and causes thyratron tube 35 to be fired which in turn causes the sampling tube 60 to operate as described previously.

In one embodiment of the invention, the time base circuit, comprising capacitor 5 and resistor 4, is arranged so that a full scale meter reading is equal to two RC, where RC is the time constant of the circuit. Thus, when a full scale reading is obtained, the charge on capacitor 5 is 86.5 percent of full charge, full charge being the voltage across regulator tube 1. Variations in characteristics of individual voltage regulator tubes is compensated for by means of a variable resistor 66 shunted across the coil 64 of meter 65. This resistor also compensates for variations in the meter, as well as partially compensates for variations in the value of components 4 and 5.

While there has been shown and described what is at present considered to be the preferred embodiment of the invention, modifications will readily occur to those skilled in the art. It is not, therefore, desired that the invention be limited to the specific embodiment illustrated in the drawings, but rather it is intended that the appended claims be construed to include such modifications as fall within the true spirit and scope of the invention.

What is claimed is:

1. An echo ranging system comprising a time base capacitor for providing an exponentially increasing voltage, a normally cut-off electronic oscillator arranged to oscillate for a predetermined time when set into oscillation, a first fixed contact and a rotating contact for causing said time base capacitor to discharge rapidly to a zero reference potential, a tuned circuit responsive to the discharge of said capacitor for initiating operation of said oscillator, a transducer coupled to said oscillator for producing a pulse of sonic energy when energized by said oscillator, said transducer being adapted to receive an echo of said sonic energy, an amplifier coupled to said transducer for amplifying echo signals, a sampling tube connected to said time base capacitor, means connected to said amplifier and responsive to the reception of an echo signal for causing said sampling tube to be activated, and means in circuit with said sampling tube for measuring the voltage across said time base capacitor.

2. An echo ranging system comprising a time base capacitor for providing an exponentially increasing voltage, a normally cut-off oscillator arranged to oscillate for a predetermined time when biased into operation, a first fixed contact and a rotating contact for causing said time base capacitor to discharge rapidly to a zero reference potential, a tuned circuit responsive to the discharge of said capacitor for initiating operation of said oscillator, a transducer coupled to said oscillator for generating sonic energy when energized by said oscillator, said transducer being adapted to receive echoes of said sonic energy, an amplifier coupled to said transducer for amplifying echo signals, a sampling tube connected to said time base capacitor, means connected to said amplifier and responsive to the reception of an echo signal for causing said sampling tube to be activated, means in circuit with said sampling tube for measuring the voltage across said time base capacitor, a second fixed contact, means connected between said rotating contact and said second contact for generating an artificial echo pulse, and a switch for impressing said artificial echo pulse upon said amplifier.

3. An echo ranging system comprising a stable voltage source, a time base capacitor, means connecting said time base capacitor across said voltage source whereby said capacitor charges exponentially, a fixed contact and a rotating contact driven at a constant speed for causing said capacitor to discharge rapidly to a zero reference potential, a normally cut-off oscillator arranged to oscillate for a predetermined time when biased into operation, a tuned circuit responsive to the discharge of said capacitor for initiating operation of said oscillator, a transducer coupled to said oscillator for generating a pulse of sonic energy when energized by said oscillator, said transducer being adapted to receive reflections of said sonic energy pulse, an amplifier coupled to said transducer for amplifying received energy signals, time varied gain control means conected between said amplifier and said oscillator for causing the gain of said amplifier to decrease immediately upon generation of a sonic energy pulse and to increase gradually thereafter, a gaseous discharge tube, means connected between said discharge tube and said amplifier for causing said discharge tube to fire upon reception of an echo pulse, a switch tube connected to said discharge tube, means connected to said switch tube and responsive to activation of said oscillator for causing said switch tube to extinguish said discharge tube, a differentiator connected to the output of said discharge tube, a sampling tube having its control element coupled to the output of said differentiator, and a voltage responsive meter connected between said sampling tube and said time base capacitor.

4. An echo ranging system comprising a stable voltage source, a time base capacitor, means connecting said time base capacitor across said voltage source whereby said capacitor charges at an exponential rate, a rotating contact driven at a constant speed and a first fixed contact for causing said capacitor periodically to discharge rapidly to a zero reference potential, a normally cut-off oscillator arranged to oscillate for a predetermined time when biased into operation, a tuned circuit responsive to the discharge of said capacitor for initiating operation of said oscillator, a transducer coupled to said oscillator for generating a pulse of sonic energy when energized by said oscillator, said transducer being adapted to receive echoes of said sonic energy pulse, an amplifier coupled to said transducer for amplifying received echo signals, time varied gain control means connected between said amplifier and said oscillator for causing the gain of said amplifier to decrease immediately upon generation of a sonic energy pulse and to increase gradually thereafter, a gaseous discharge tube, means connected between said discharge tube and said amplifier for causing said discharge tube to be triggered into a conductive state upon reception of an echo pulse, a switch tube connected to said discharge tube and responsive to activation of said oscillator for biasing said discharge tube to non-conduction, a differentiator connected to said discharge tube, a sampling tube having its control element coupled to said differentiator, a voltage responsive meter conencted between said sampling tube and said time base capacitor, a second fixed contact spaced from said fixed contact, means connected between said second contact and said rotating contact for generating an artificial echo pulse signal, and a switch for impressing said artificial echo pulse signal upon said amplifier.

References Cited in the file of this patent
UNITED STATES PATENTS

| | | |
|---|---|---|
| 2,346,093 | Tolson | Apr. 4, 1944 |
| 2,502,938 | Fryklund et al. | Apr. 4, 1950 |
| 2,624,871 | Meagher | Jan. 6, 1953 |